(12) United States Patent
Steinman et al.

(10) Patent No.: US 9,862,440 B2
(45) Date of Patent: Jan. 9, 2018

(54) LOCKING BICYCLE STAND

(71) Applicant: CAPITOL DEVELOPMENT, LLC, Sunrise, FL (US)

(72) Inventors: Robert Steinman, Coral Springs, FL (US); Simon Turgeon, Plantation, FL (US)

(73) Assignee: Capitol Development, LLC, Sunrise, FL (US)

( * ) Notice: Subject to any disclaimer, the term of this patent is extended or adjusted under 35 U.S.C. 154(b) by 0 days.

(21) Appl. No.: 15/113,835

(22) PCT Filed: Jan. 23, 2015

(86) PCT No.: PCT/US2015/012782
§ 371 (c)(1),
(2) Date: Jul. 24, 2016

(87) PCT Pub. No.: WO2015/112917
PCT Pub. Date: Jul. 30, 2015

(65) Prior Publication Data
US 2017/0008583 A1  Jan. 12, 2017

Related U.S. Application Data

(60) Provisional application No. 61/930,925, filed on Jan. 23, 2014.

(51) Int. Cl.
E05B 73/00 (2006.01)
B62H 5/00 (2006.01)
B62H 3/08 (2006.01)

(52) U.S. Cl.
CPC ............... *B62H 5/005* (2013.01); *B62H 3/08* (2013.01)

(58) Field of Classification Search
CPC .................................. B62H 3/08; B62H 5/005
USPC ........... 248/553; 211/5, 17, 21, 22; 340/427, 340/432
See application file for complete search history.

(56) References Cited

U.S. PATENT DOCUMENTS

| | | | | |
|---|---|---|---|---|
| 565,057 A | * | 8/1896 | Westphal ................. | B62H 3/00 211/20 |
| 3,865,245 A | * | 2/1975 | Lieb ......................... | B62H 3/10 211/5 |
| 4,126,228 A | * | 11/1978 | Bala ......................... | B62H 3/08 211/22 |
| 4,352,432 A | * | 10/1982 | Smith ....................... | B62H 3/08 211/19 |
| 5,278,538 A | * | 1/1994 | Ainsworth ............... | B62H 3/04 180/287 |

(Continued)

FOREIGN PATENT DOCUMENTS

| FR | 2763554 A1 | 11/1998 |
|---|---|---|
| KR | 100823574 B1 | 4/2008 |

*Primary Examiner* — Gwendolyn Baxter (57) ABSTRACT

A stand for securely parking a wheeled vehicle, particularly a bicycle, motorcycle, motor scooter or the like, is itself provided with a locking mechanism for locking the vehicle relative to the stand. This conveniently obviates the need for a vehicle owner to carry his own locking devices and related equipment, such as chains and cables, all of which can be cumbersome and heavy. The stand uses cable-actuated latch mechanisms to either provide the locking functionality directly or as a mechanism for securely retaining a cable or chain provided as part of the stand in a locking state.

17 Claims, 11 Drawing Sheets

(56) References Cited

U.S. PATENT DOCUMENTS

| | | | | |
|---|---|---|---|---|
| 5,301,817 A * | 4/1994 | Merritt | ............. | A47F 7/04 |
| | | | | 211/20 |
| 6,157,315 A * | 12/2000 | Kokubo | ............. | G07B 15/00 |
| | | | | 211/5 |
| 6,575,310 B2 * | 6/2003 | Chamoun | ............. | B66F 3/08 |
| | | | | 211/17 |
| 7,784,622 B2 * | 8/2010 | Bernard | ............. | B62H 3/08 |
| | | | | 211/20 |
| 8,061,499 B2 * | 11/2011 | Khairallah | ............. | B62H 3/02 |
| | | | | 194/211 |

\* cited by examiner

LOCKING BICYCLE STAND

FIELD OF THE INVENTION

The present invention generally relates to lockable stand for parking a bicycle or similar wheeled vehicle, such as a motorcycle or motor scooter.

BACKGROUND OF THE INVENTION

Conventional stands for parking (and locking) bicycles are typical fixed structures such as racks or particularly shaped bollard-like posts that to which a bicycle is locked, usually using the bicycle owner's chain and lock or lock alone.

SUMMARY OF THE INVENTION

The present invention relates to a stand for parking a bicycle or the like, the stand itself being provided with elements for retaining and securely locking the bicycle to the stand. This permits the bicycle rider to avoid carrying locks, chains, and/or cables for locking the bicycle, all of which can be burdensomely heavy and/or awkward to transport.

The present invention relates to both a manually-operated variant and an electrically-powered variant of a first embodiment, and a second embodiment having multiple locking points actuable from a central actuation mechanism.

BRIEF DESCRIPTION OF THE DRAWINGS

The present invention will be even more clearly understandable in view of the written description herein and the figures appended hereto, in which.

It is noted that not all of the figures are necessarily drawn to the same scale, including elements shown in multiple-part figures. In addition, any given figure may not necessarily illustrate all physical features that are present according to the present invention, especially where it is desirable to clearly illustrate certain features being discussed in parallel with the written description.

DESCRIPTION OF THE INVENTION

Unless mutually exclusive, features of the present invention described and/or illustrated herein may be used in combination with other features of the present invention, even without expressly or exhaustively disclosing every possible combination of features disclosed herein.

For the sake of clarity and simplicity, the present invention is principally set forth hereinbelow with reference to a bicycle. However, it is expressly noted that the present invention contemplates use with any comparable wheeled vehicle (including, by way of example and without limitation, motorcycles and motor scooters (some of which having more than two wheels)).

A first embodiment of the present invention is generally illustrated in FIGS. 1-6. A first variant of the first embodiment is manually actuated, and a second variant thereof has an electrically-actuated locking mechanism (as described in detail hereinbelow).

Figure 1:
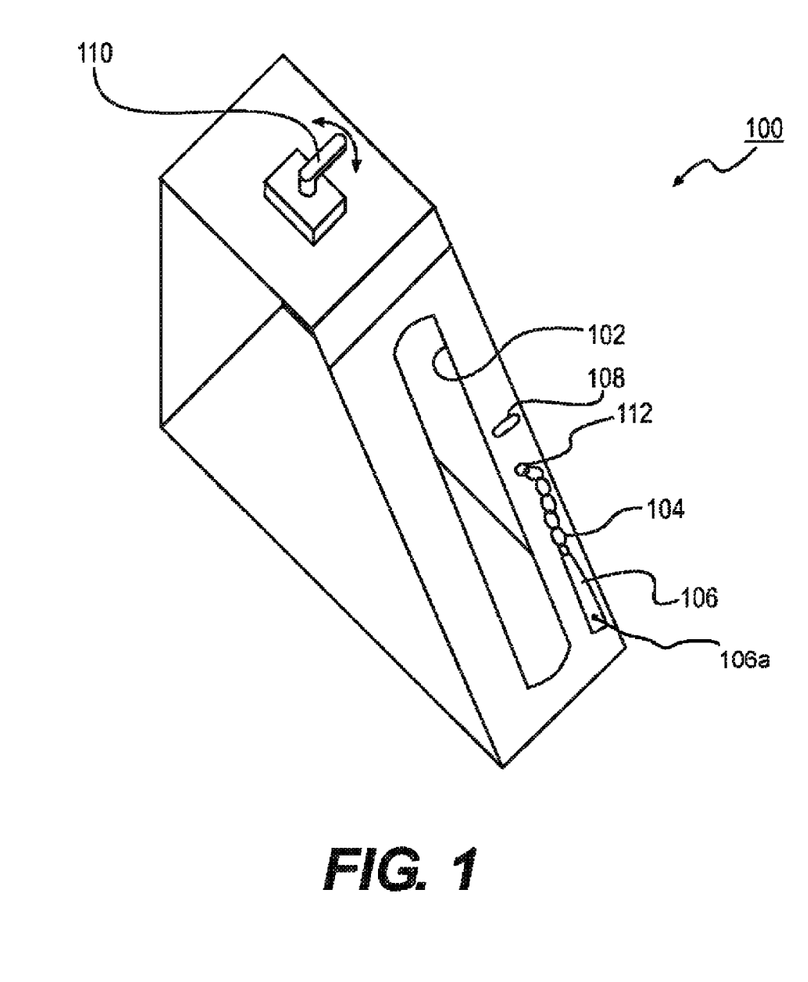
FIG. 1 is a perspective view generally illustrating a first variant of the first embodiment of the present invention.

FIG. 1 generally illustrates a first variant of the first embodiment of the present invention. More specifically, a stand for lockingly receiving a bicycle or similar wheeled vehicle (including, for example and without limitation, a motorcycle or a motor scooter) 100 is shown in FIG. 1. Stand 100 is sized (particularly in a height sense) to at least partly receive a wheel of a bicycle (not shown) in a slot 102. Generally, the lateral width of slot 102 is sufficient to easily receive a wheel of a bicycle or the like therein (including a variety of bicycle wheel widths, such as "road" tires to "off-road" tires). The stand 100 further includes a locking cable or chain or the like 104. In order to simplify the present disclosure, reference will be made henceforth to a "cable" 104, but it should be clearly understand that the present invention equally contemplates any flexible anti-theft element, particularly including a chain. Furthermore, cut-resistant chains (for example, presenting links having flattened surfaces (instead of a generally round cross-sections)) and cut-resistant cables (including, for example, braided or twisted metal wire) are known in the art, and the optional use of such elements is contemplated in a preferred embodiment of the present invention.

An end of cable 104 opposite the end provided with locking key 106 is generally housed within the structure of stand 100 and extends externally from stand 100 via an aperture 112. See, for example, FIG. 2, discussed below.

The locking cable 104 may be provided with a rigid locking key 106 on a distal end thereof. The locking key 106 is made of any rigid material appropriate for the environment and the use described. In a particular example, locking key 106 is made from rigid metal, such as steel or alloy. In an example, locking key 106 is provided with an opening or an aperture 106*a* therethrough.

Generally, the length of locking cable 104 is sufficient to permit a user to pass the locking cable 104 through at least the spokes of a bicycle wheel received in slot 102 and back around so that the locking key 106 can be inserted into locking slot 108, thereby forming a retaining loop that restrains the bicycle wheel (and thus the bicycle) in the slot 102 of stand 100. In another example of the present invention, the locking cable 104 is passed through both the spokes of the bicycle wheel and around the fork of the bicycle frame that supports the bicycle wheel. In yet another example, the locking cable 104 is passed through the "front triangle" of the bicycle frame, as is referred to in the art, which is defined by the top tube, the down tube and the seat tube of the bicycle frame. This arrangement increases protection of the bicycle frame, especially when the bicycle wheel may be relatively easy to separate from the bicycle frame.

It is noted that locking slot 108 is illustrated in FIG. 1 as being on the same side of slot 102 as the locking cable 104. However, locking slot 108 may obviously be provided on the other (lateral) side of slot 102.

A first variant of the first embodiment is manually actuated, as mentioned above. For example, FIG. 1 illustrates a manually graspable handle 110 that rotates between a locking position and a release position, as is discussed in further detail below, particularly with respect to FIGS. 3a-3c and FIG. 4.

The overall structure of stand 100 is preferably rigid frame that can be fixedly mounted in a specific location. For example and without limitation, frame of stand 100 may be made from rigid sheet metal. In one example of the present invention, the framework of stand 100 is constructed with tabs or flanges or the like in a manner that permits several like stands 100 to be ganged together (usually side-by-side) and fixed as an assembly (such as by bolts, rivets, welding, etc.) to provide a combined stand having multiple places to park and lock several bicycles.

Figure 2:
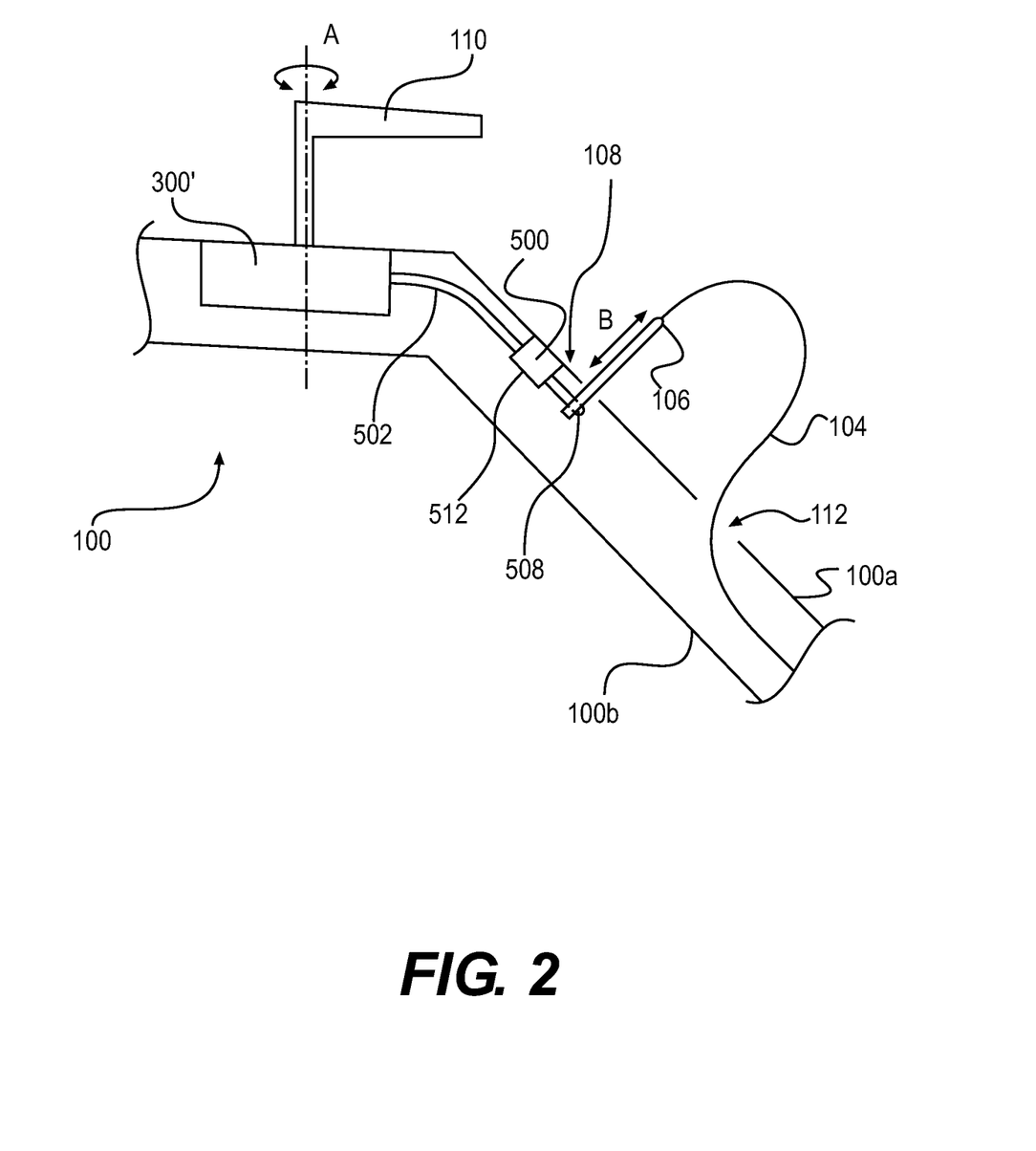
FIG. 2 is a partial schematic cutaway view illustrating certain details of the locking mechanism of the first variant of the first embodiment.

At least a part of the frame of stand 100 is double-walled, with an exterior wall 100a and an interior wall 100b, as seen in FIG. 2. FIG. 2 is a schematic cross-sectional view of an upper portion of stand 100, but is not necessarily to the same scale as that of the equivalent elements illustrated in FIG. 1.

FIG. 2 again illustrates a generic manually graspable handle 110, rotatable about an axis A between a locking position and a release position. Handle 110 is a generic representation, and is meant to encompass equivalent rotatable knobs and grips and the like. In an example of the present invention, the handle 110 and a corresponding portion of the adjacent frame of stand 110 may be provided with respective, fixedly placed eyelets or the like (not seen here) that come into adjoining correspondence in the locking position of handle 110 so that a locking device (such as a padlock) can be passed therethrough to lock the handle 110 in the locking position. In addition, other rotational locking mechanisms can be substituted for handle 110 in accordance with the present invention, such as providing a locking cylinder (such as a key-operated cylinder) directly in the handle 110 as is known in the art.

Handle 110 is operably connected to actuation mechanism 300' (discussed in further detail below). Actuation mechanism 300' is operably connected (via flexible connector 502) to a latch mechanism 500 (also described in detail below). Latch mechanism 500 includes, in pertinent part, a selectively extensible and retractable latch member 508 that selectively engages aperture 106a of the locking key 106 when the locking key 106 is inserted in locking slot 108 (along direction B), so as to retain the locking key 106 (and therefore the cable 104 connected thereto). Locking slot 108 may be shaped and positioned, relative to latch mechanism 500, in a manner to ensure that aperture 106a is assuredly positioned relative to latch member 508 when the locking key 106 is inserted into locking slot 108.

As mentioned above, a portion of cable 104 extends on an exterior side of stand 100 between locking key 106 and aperture 112 so as to effectively define a loop for retaining one or more parts of a bicycle therein. (The illustrated size of the loop defined by cable 104 in FIG. 2 is clearly meant to be illustrative, and its actual size and/or extent in actual use is appropriate to provide extend around one or more parts of the bicycle being locked.) The remaining portion of cable 104 passes back into an interior of stand 100 via aperture 112 as schematically illustrated in FIG. 2. Of course, the opposite end of the cable 104 is fixedly connected by a known method (such as bolting, welding, etc.) to an interior of stand 100 so that that end of the cable 104 cannot be pulled out of the stand 100, such that a locking functionality can be preserved.

Optionally, a mechanism can be provided to bias the cable 104 towards retraction (back into aperture 112) when the locking key 106 is not engaged in locking slot 108. For example, if the portion of stand 100 where locking slot 108 and aperture 112 are provided has a vertical aspect (such as the angled portion schematically illustrated in FIGS. 1 and 2), a weight element (not shown) could be attached to an intermediate part of cable 104 within the frame of stand 100 (i.e., relatively "below" aperture 112, on the opposite side thereof from locking slot 108), which will tend to slide downward and thereby retract cable 104 in through aperture 112. Similarly, cable 104 could be resiliently biased towards retraction, for example, by way of a resilient member like a coil spring (not shown) attached to an intermediate portion of cable 104 and a lower interior portion of the frame of stand 100.

An example of a latch mechanism and actuation mechanism combination suitable for the present invention is disclosed, for example, in commonly owned published patent application WO 2014/088633.

Generally, the first embodiment uses a latch mechanism 300' including an axially retractable and extensible latching member (see, for example, 508 in FIG. 4) to selectively engage the locking key 106 of locking cable 104. The latching member 508 is, for example, resiliently biased towards axial extension (i.e., the orientation in which the pin member lockingly engages the locking key 106). The first variant uses mechanical actuation to selectively retract the pin member (to unlock the stand), and the second variant uses, in pertinent part, an electric motor to selectively retract the latching member 508.

Figure 3C:
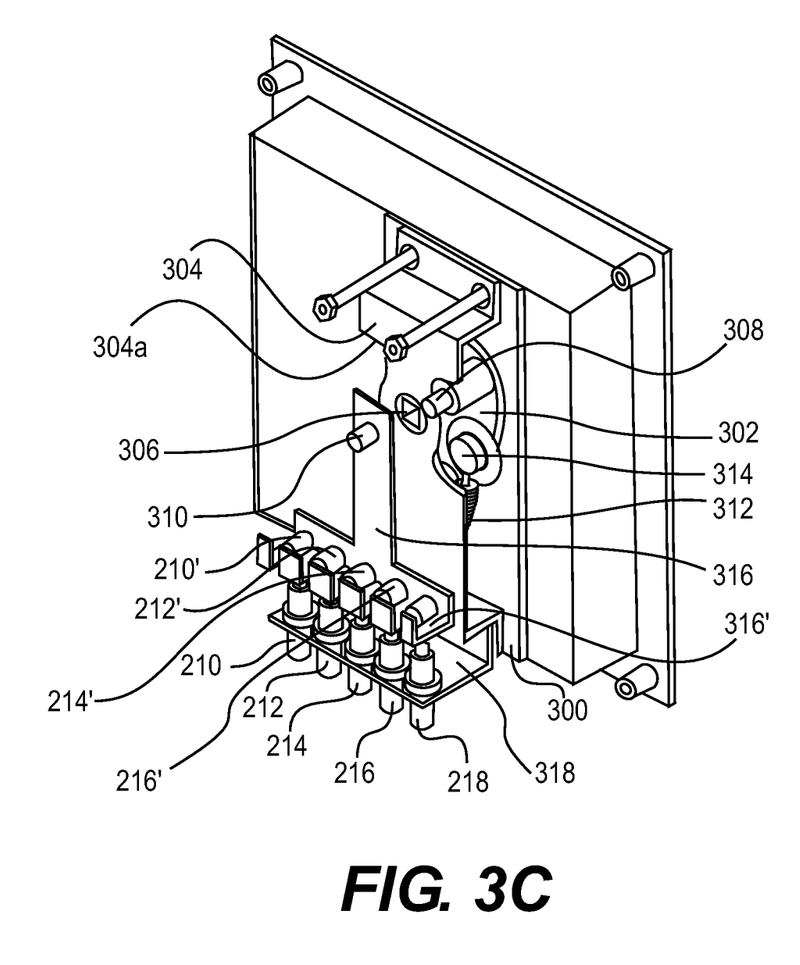
Figure 4:
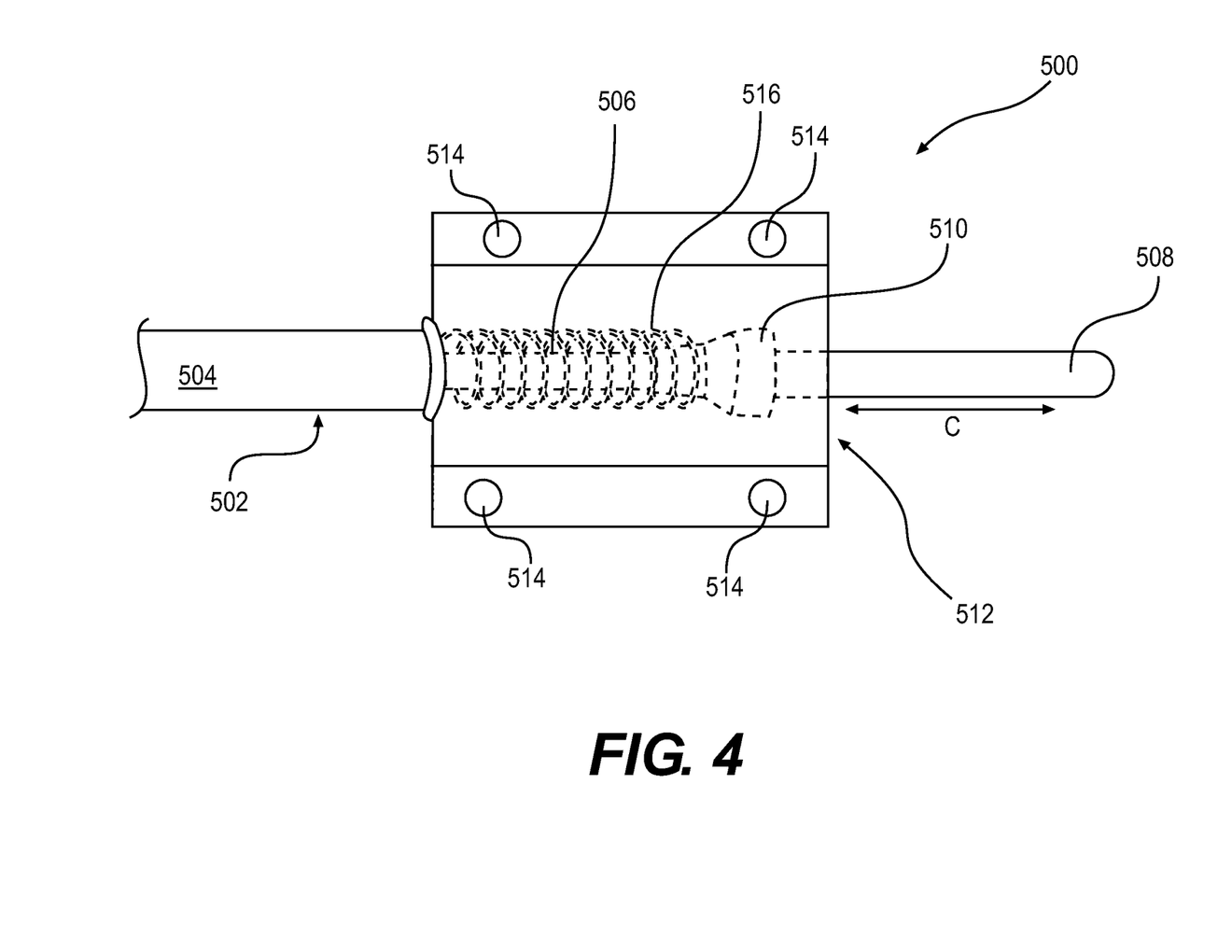
FIG. 4 is a view of a latch mechanism according to the present invention.

An example of a latch mechanism 500 according to the present invention is connected to a flexible connector 502, as seen in FIG. 4. The flexible connector 502 has generally an outer flexible sheath 504, and a freely slidable cable (for example, a metal cable) 506 disposed within the sheath 504. The opposite end of cable 506 from the latch mechanism 500 terminates at, for example, an anchor provided on an opposite end of cable 506. (See FIG. 3c and the written description below corresponding thereto.) An elongate latching member 508 is fixedly attached to an end of cable 506 by a suitable connector 510. Connector 510 may be, for example, a sleeve or ferrule having one end having a diameter suitable for fixedly receiving an end of cable 506 and a second end having a diameter having a diameter suitable for fixedly receiving an end of latching member 508, bearing in mind that these respective diameters may differ. Connector 510 may be attached to cable 506 and latching member 508 in any known matter suitable for the intended use, including without limitation, crimping the connector 510 onto one or both of the cable 506 and latching member 508, adhesive, welding, etc.

The latching member 508 is preferably made of a generally rigid material that resists bending that is appropriate for the actual and commercial environment. As such, the latching member 508 could be made from, without limitation, hard polymer resin, plastic, metal, or even wood.

Strictly by way of example, FIG. 4 illustrates a mounting bracket/housing 512 to which the flexible connector 502 may be fixed or through which it may be threaded (via an aperture or the like provided in an end of the housing 512). Preferably, an axially resilient member, such as coil spring 516, is provided in a conventional manner in order resiliently bias latching member 508 into extension. As seen in FIG. 4, latch mechanism 500 includes a housing 512 that is generally rigid and may be made from, for example, metal or hard plastic. Optionally, the flexible connector 502 is connected to the housing 512 such that some or all of the portion of the cable 506 extending outside of the sheath 504, a proximal end of latching member 508, and the connector 510 connecting the cable 506 and latching member 508 is disposed within the housing 512. This may be helpful in order to avoid entry of contaminants (such as dirt particles) into the mechanism where they could impede operation of the assembly. In general, the latch mechanism 500 can be fixed in a desired location by screws, nails, staples, etc. driven through peripheral portions of housing 512 into an underlying surface. See, for example, fixation points (for example, mounting holes) 514 schematically indicated in FIG. 4.

Figure 3A:
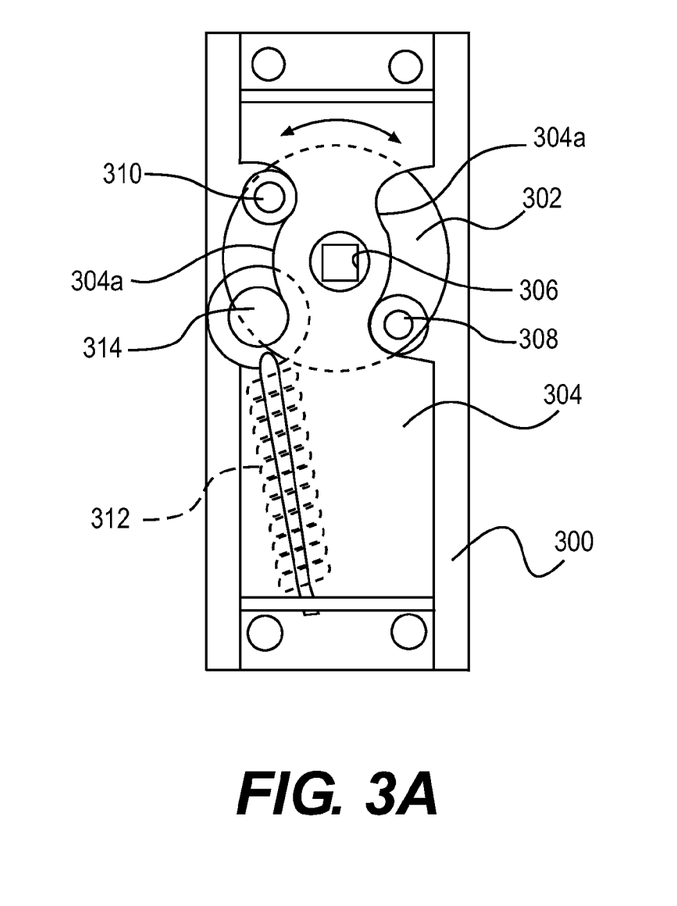
FIGS. 3*a*-3*c* illustrate various aspects of a mechanism for selectively pulling a connecting wire or cable for operating the locking features of the present invention.
Figure 3B:
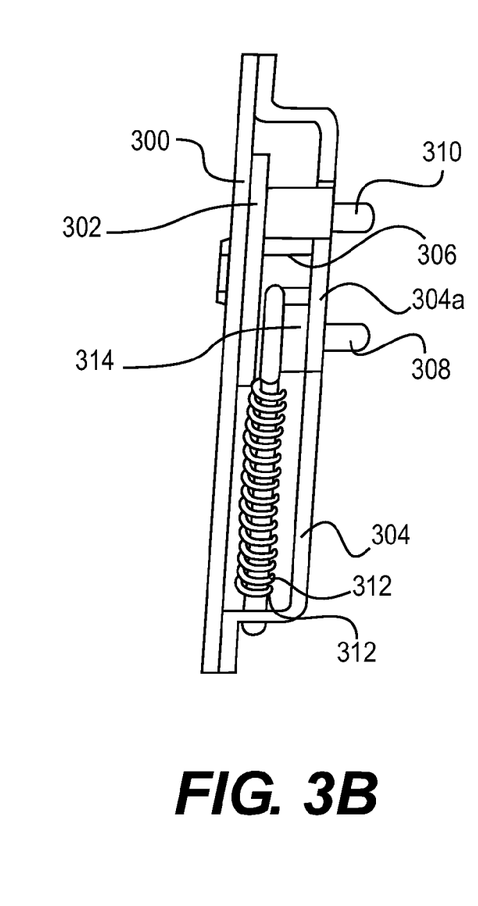

FIGS. 3*a*-3*c* illustrate an example an actuation mechanism 300' by which the cable 506 in FIG. 4 can be selectively pulled within sheath 504. It includes a base plate 300 on which a drive member 302 is rotatably mounted. A cover plate 304 is mounted on base plate 300 and is shaped so as to be spaced away from (generally along a direction parallel to an axis of rotation of drive member 302) base plate 300, particularly in order to permit drive member 302 to be rotatably mounted between base plate 300 and cover plate 304. In one example of the present invention, at least a part of cover plate 304 is generally parallel to and spaced away from base plate 300 to define a space in which drive member 302 is disposed. Furthermore, the drive member 302 may be partly rotatably mounted on the base plate 300 and partly supported by cover plate 304. Base plate 300 and cover plate 304 may be attached to each other in any conventional manner suitable to space and environmental concerns, such as, without limitation, screws, bolts, welding, gluing, etc.

Drive member 302 is illustrated as being circular, this being useful relative to addressing certain features of its rotational movement. However, the particular shape of the drive member 302 is not overly critical to the present invention to the extent it satisfies space, size, and environmental limitations.

The axis of rotation of drive member 302 corresponds with the axis of rotation A of the handle 110 in FIG. 2 so that rotation of the handle 110 drives rotation of drive member 302. In one example of the present invention, drive member 302 is provided with a central bore 306 (which is, for example, square) that is shaped to conformingly receive a mounting shaft of the handle 110 therein. The handle shaft may be fixed in place in central bore 306 if desired in any conventionally known manner. The shape of the handle is not specifically critical to the present invention as long as it facilitates being manually gripped, so a knob, t-shaped handle, etc. could also be used.

In an example of operation, the handle 110 is rotatable through an arc of about 90°. Because the handle 110 is operably connected to drive member 302 as described above, drive member 302 also rotates through an arc of about 90°.

The present invention is not necessarily limited to manual actuation via a handle. The drive member 302 could also be selectively actuated via, for example, a selectively operated motor (as described elsewhere herein with respect to the second variant of the first embodiment) suitably coupled to the drive member 302.

Drive member 302 is provided with first and second nubs 308, 310 on diametrically opposed edges of drive member 302, which is circular by way of example in the figures. If the drive member 302 is not circular, the nubs 308, 310 are provided on diametrically opposite sides of an imaginary circle of a given radius centered on the axis of rotation of drive member 302 (and handle 110).

As seen in FIGS. 3*a* and 3*b*, the drive member 302 may desirably be biased towards rotation by way of a spring member 312 that is under tension at the extreme rotational positions of the drive member 302/handle 110. For example, a coil spring 312 may be fixedly attached at one end to an end portion of cover plate 304, and attached at its other end to a third nub 314 provided on drive member 302. Nub 314 is provided circumferentially about halfway (or about 90° in a rotational sense) between nubs 308, 310 such that when the drive member 302 is rotated, nub 314 travels along a lower (as seen in FIGS. 3*a* and 3*b*) edge of drive member 302. According to the present invention, the spring member 312 is useful and desirable, but not critical to operation.

In a particular example of the present invention, nubs 308, 310 extend (along the direction of the axis of rotation of drive member 302) beyond the cover plate 304 (see FIG. 3*b*). Cover plate 304 is therefore desirably provided with arcuate cutouts 304*a* at its edges corresponding with the respective paths of travel of nubs 308, 310 in order to accommodate the movement of these protruding nubs 308, 310. The cutouts 304*a* are about 90° in circumferential arc, corresponding to the limits of rotation of the drive member 302. The opposing ends of cutouts 304*a* may therefore desirably act as rotation limiters when the nubs 308,310 abut them.

When spring 312 is provided under tension as shown in FIG. 3*a*, drive member 302 is biased towards counterclockwise rotation (relative to FIG. 3*a*) until nub 310 is about at the position where nub 314 is shown in FIG. 3*a*. By this rotation of drive member 302, nub 314 in turn moves to the position previously occupied by nub 308 in FIG. 3*a*. As a result, spring 312 will then bias the drive member 302 into clockwise rotation, similar to the manner in which it initially biased the drive member 302 into counterclockwise rotation. Preferably the tension in spring 312 is relatively light—only enough to assist or encourage rotation of drive member 302/handle 110 without causing drive member 302/handle 110 to rotate independently without actual operation of the handle 110.

A pull arm 316 (see FIG. 3*c*) is connected to, for example, nub 310 so that the pull arm 316 is selectively retracted (when nub 310 is in the relatively higher position seen in FIG. 3*a*) or extended (when the mechanism is rotated as described above, so that nub 310 is moved to the position of nub 314 in FIG. 3*a*). The pull arm 316 is for example a rigid member that is operably connected at its opposite end to a proximal end of cable 506 (such as being engaged to the anchor provided at the proximal end of cable 506), so as to selectively pull the cable 506 within sheath 504. In general, the pull arm 316 is pivotably mounted (in any known manner) relative to nub 310 (in order to provide a linear pulling force component while accommodating rotation of drive member 302). As drive member 302 (and thus, in pertinent part, nub 310) moves, the pull arm 316 is correspondingly moved in opposite directions. The distal end of the pull arm 316 (that is, opposite the end connected to nub 310) is, for example, a hooked portion 316' having a slot into which an end of metal cable 506 is retained. In FIG. 3c, several cables are illustrated (as will be applicable in the second embodiment of the invention discussed later), but of course the arrangement being described can be used with a single cable 506. The cable 506 is provided with a knob or anchor (indicated by 210', 212', etc. in FIG. 3c) at its end, which allows the cable to be retained by the hooked portion 316'.

In a particular example of the present invention, the flexible connector 502 is a flexible cable having a structure similar to conventional (and commercially available) cables used in bicycles and motorcycles to actuate brakes, gear shifting and clutch mechanisms, and the like. Most generally, cables of this type include a metal central cable (for example, braided steel wire) that is freely slidable along its length within an outer flexible rubber, plastic, polymer, etc. tubular sheath. That is, the metal central cable can be pulled/released at one end to cause the metal cable to move freely relative to its surrounding sheath. In a common example of such cables, the internal metal cable is provided at at least one end with an enlarged anchor or head mounted thereon or attached thereto, by which a cooperating engaging portion can more easily engage and retain the metal cable to provide a selective pulling action relative to the sheath. Cables of this type used in motorcycles are comparatively thicker (with respect to overall cross section) than those used in bicycle applications and may considered desirably more mechanically durable than bicycle cables.

When cable 506 is thusly connected to latching member 508, the latching member 508 can be extended and retracted relative to housing 512 (see arrow C in FIG. 4) in accordance with the tension selectively applied at the other end of the flexible connector via the operation of the actuation mechanism 300' that selectively applies tension to the cable 506.

In one example of the present invention, a resilient biasing member, such as a coil spring 516 may be included in the latch mechanism 500 in order to bias the latching member 508 towards an extended direction. For example, the coil spring 516 may be provided such that a portion of cable 506 extends axially therethrough as seen by way of example in FIG. 5. One end of the coil spring may be disposed in abutting relationship with, for example, a proximal wall of housing 512. The other end of coil spring 516 may abut, for example, a radially outward extending portion of connector 510. The coil spring 516 may be in a neutral state of tension when the latching member 508 is at its fully extended position or it may be under relatively light compressive tension, such that retracting the latching member 508 (by pulling cable 506) compresses or further compresses coil spring 516 so that the latching member 508 is biased towards an extended latching position along direction C.

It will be recalled that FIG. 3a corresponds to an unlatched position of the system, in which the latching member (like 508) is retracted from a latching position. The pull arm 316 is pulled relative to the flexible connector 502 in FIG. 4, such that the metal cable 506 therein is pulled within its sheath 504, and the latching member 508 at the other end is retracted.

When the pull arm is lowered (i.e., nub 310 is moved to the position of nub 314 shown in FIG. 3a) tension on the metal cable 506 is released. However it should be understood that the tension on the metal cable is merely released, and the cable is not, alone, "pushed" into extension. For this reason, the provision of a biasing member, such as coil spring 516 in FIG. 4, assists in the latching member attaining an extended position when tension on metal cable 506 is released.

Returning to FIG. 4, latching member 508 may be arranged to protrude from a similarly sized bore or opening (not specifically illustrated in the view of FIG. 4) formed in a corresponding end of housing 512. The bore may thus serve to allow the latching member 508 to extend and retract axially (that is, along arrow C) while at least partly limiting lateral movement of the latching member 508. It may be useful to limit the extent to which the latching member 508 extends outside of housing 512 so as to limit bending forces on the latching member 508 that could snap the latching member.

Figure 5:
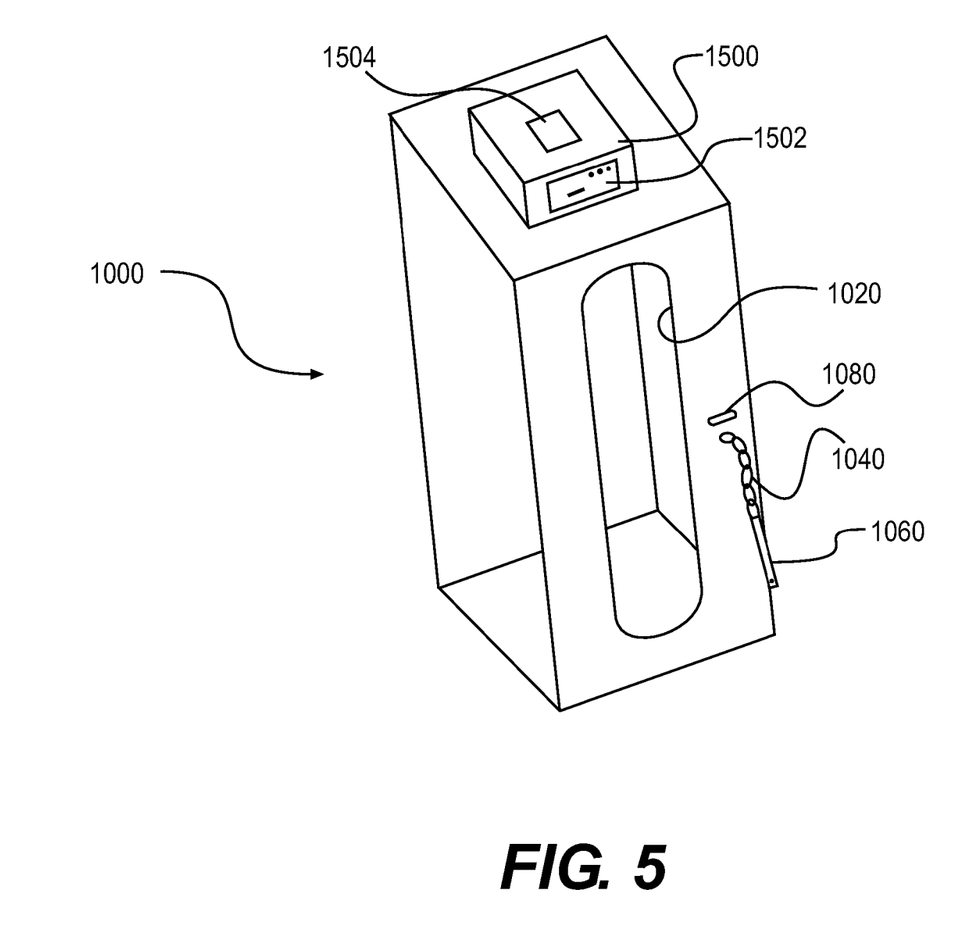
FIG. 5 is a perspective view of a second variant of the first embodiment of the present invention, which is, generally, electrically powered.
Figure 6:
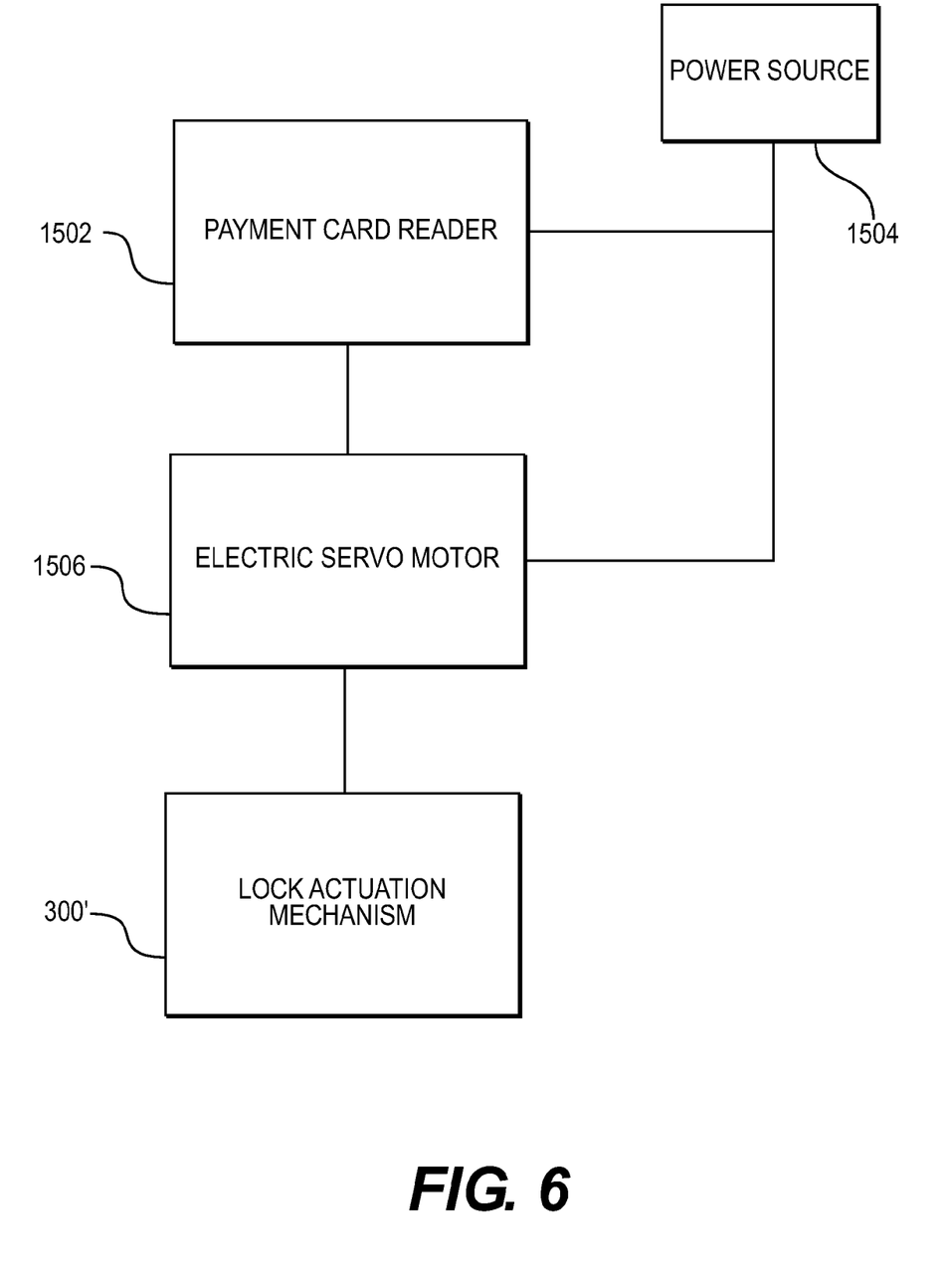
FIG. 6 is a functional illustration describing part of the functioning of the second variant of the first embodiment of the present invention.

FIG. 5 illustrates a second variant of the first embodiment of the present invention. The features of stand 1000 in FIG. 5 share the features of stand 100 discussed hereinabove and with respect to FIGS. 1-4. In the second variant, the actuation mechanism of stand 1000 is electrically operated instead of manually operated as in the first variant.

More particularly, FIG. 5 illustrates a stand 1000, which, like the stand 100 of FIGS. 1-4, has a slot 1020 for receiving a wheel of a bicycle or the like; a locking cable (or chain or the like) 1040; and a locking key 1060 provided at the end of the locking cable 1040, for selective engagement in locking slot 1080. In FIG. 5, the stand 1000 is provided with an electromechanical unit 1500 instead of the handle 110 of stand 1000. Generally, the electromechanical unit 1500 includes an electric motor or the like for actuating the actuating mechanism described above, instead of by way of the manual handle 110. The electromechanical unit 1500 also generally includes a control mechanism and a power source for the motor.

For example, unit 1500 in FIG. 5 may include a conventional payment card reader (such as credit, debit, and prepaid cards, readable by way of electronic chip, magnetic strip, or by contactless (for example, RFID) mechanisms), generically indicated at 1502. The unit 1500 may, strictly by way of example and without limitation, include a conventional photovoltaic unit 1504, which can be used to charge a conventional battery or other electric storage cell (not shown), for powering a conventional electric servo motor (not shown). The provision of a payment card reader is appropriate when the stand 1000 is used to provide a lockable bicycle stand as a paid service.

In an example of the operation of the second variant, the payment card reader 1502 can function both as a payment terminal and as a control mechanism for locking and unlocking the stand 1000. For example, upon arrival, a user's payment card is read (in any conventional manner in the field of payment systems) which both initiates a payment process and (after passing the cable 1040 through the wheel and/or frame of the bicycle and inserting the locking key 1060 back into locking slot 1080) sends an electrical actuation signal to a conventional servo motor (represented generally at 1506) which may, for example, drive the actuation mechanism (as described above) from a release position into a locking position (in which latching member 508 is left extended through the aperture of the locking key 1060, to thereby lockingly engage the locking key 1060 in locking slot 1080 and thereby lock a bicycle or the like in the stand 1000.

When departing, the user's payment card is read a second time. This operates to conclude the payment operation (for example, calculating a payment to be charged based on the time spent parked at the stand). In addition, the second operation can include sending a second actuation signal to the electric servo motor 1506 that causes the actuation mechanism 300' to move to a release position (as described above) wherein the latching member 508 is retracted and disengaged from locking key 1060, so that locking key 1060 can be withdrawn from the locking slot 1080 and the bicycle (or the like) can be removed from the stand 1000. If the locking key 1060 is retained in the locking slot 1080 even when the stand 1000 is not in use, the first and second payment card reading operations discussed above may each be further modified to include providing both disengage and engage signals to the electric servo motor.

In an alternative manner of operation of the first embodiment, the latch member 508 may by default always be put in the extended position (for example, by way of the resilient bias of coil spring 516. Upon arriving at the bike stand of the present invention, a user parks the bike with a wheel located in the wheel slot, threads the cable 104 through the wheel and/or frame and inserts the locking key back into the locking slot. The act of insertion of the locking key into the lock slot in this example forces the latch member into slight retraction (against the resilient bias towards extension) to permit the locking key to move into a correct position where the aperture in the locking key is put into alignment with the latch member, whereupon the latch member is allowed to resilient extend, and thereby retain the locking key in place. This mechanical action may be facilitated by providing a beveled or wedged leading edge on the locking key and/or on a side of a tip of the latch member, to help the locking key force the latch member into temporary retraction. With this arrangement, therefore, the user only engages in an unlocking operation upon departing to retract the latch mechanism and withdraw the locking key, whether by turning the handle 110 or by the unit 1500 sending an unlock signal to the servo motor when the user's payment card is read a second time.

FIGS. 7-10 illustrate a second embodiment of a lockable bicycle stand that uses the actuation and latch mechanisms described above relative to FIGS. 1-6. In effect, the second embodiment uses several latch mechanisms of the type described above and illustrated in FIG. 4.

Figure 7:
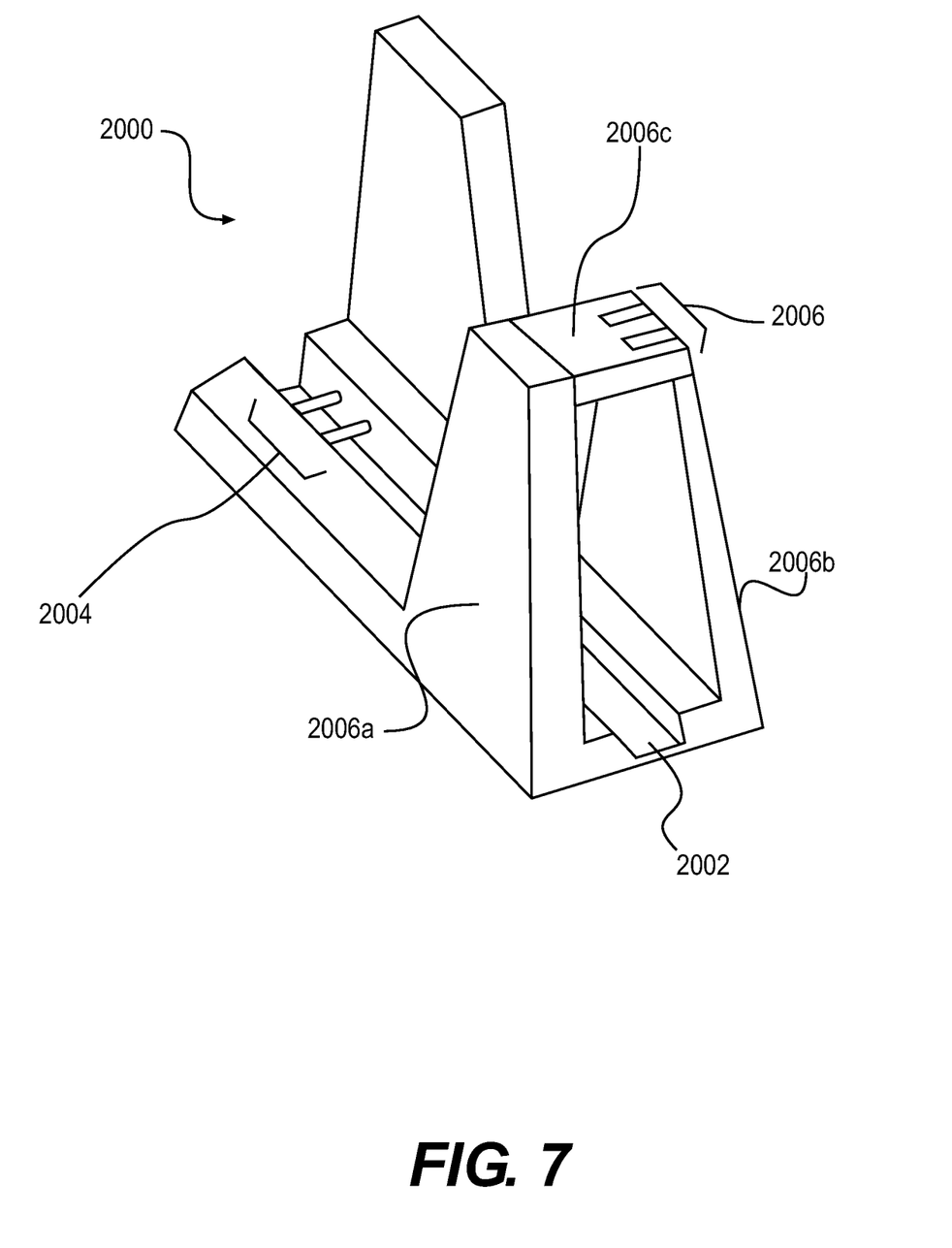
FIG. 7 is a partly schematic perspective view of an example of a second embodiment of the present invention.
Figure 8:
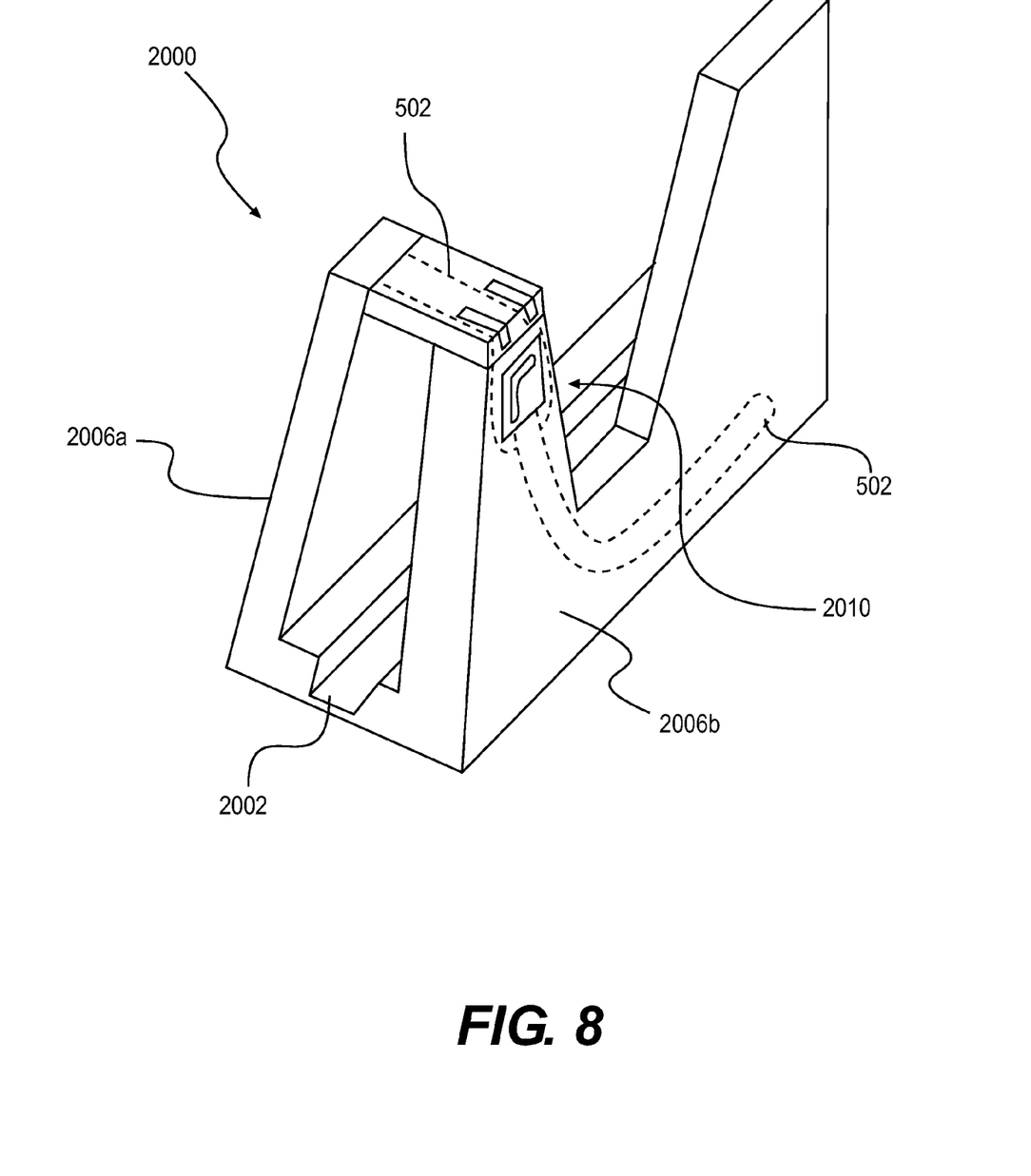
FIG. 8 is a partly schematic reverse perspective view of the second embodiment of the present invention, relative to FIG. 7.

FIG. 7 is a perspective somewhat schematic view of a stand 2000 adapted for receiving a two-wheeled vehicle such as a bicycle. Generally, stand 2000 includes a rigid frame (for example, made from rigid sheet metal or a durable and rigid plastic or other polymer material). Stand 2000 may include a wheel groove 2002 along which wheels of a bicycle are guided into and out of the stand 2000. Generally the stand 2000 includes a first locking position 2004 and a second locking position 2006. At the first locking position 2004, one or more latch members (in accordance with the arrangement described and illustrated relative to FIG. 4) are arranged to selectively extend across the width of the wheel groove 2002. Preferably, the latch members at first locking position are arranged relatively above the bottom of the wheel groove 2002 (that is, the surface on which the wheels roll and rest) sufficiently high to pass over a lower portion of the wheel and through the spokes of the wheel into engagement with the other side of the wheel groove 2002. Preferably, the frame of stand 2000 on the side of wheel groove 2002 into which the latch members are selectively retracted is sufficiently wide to permit sufficient room for retraction into the interior of the frame.

Figure 9:
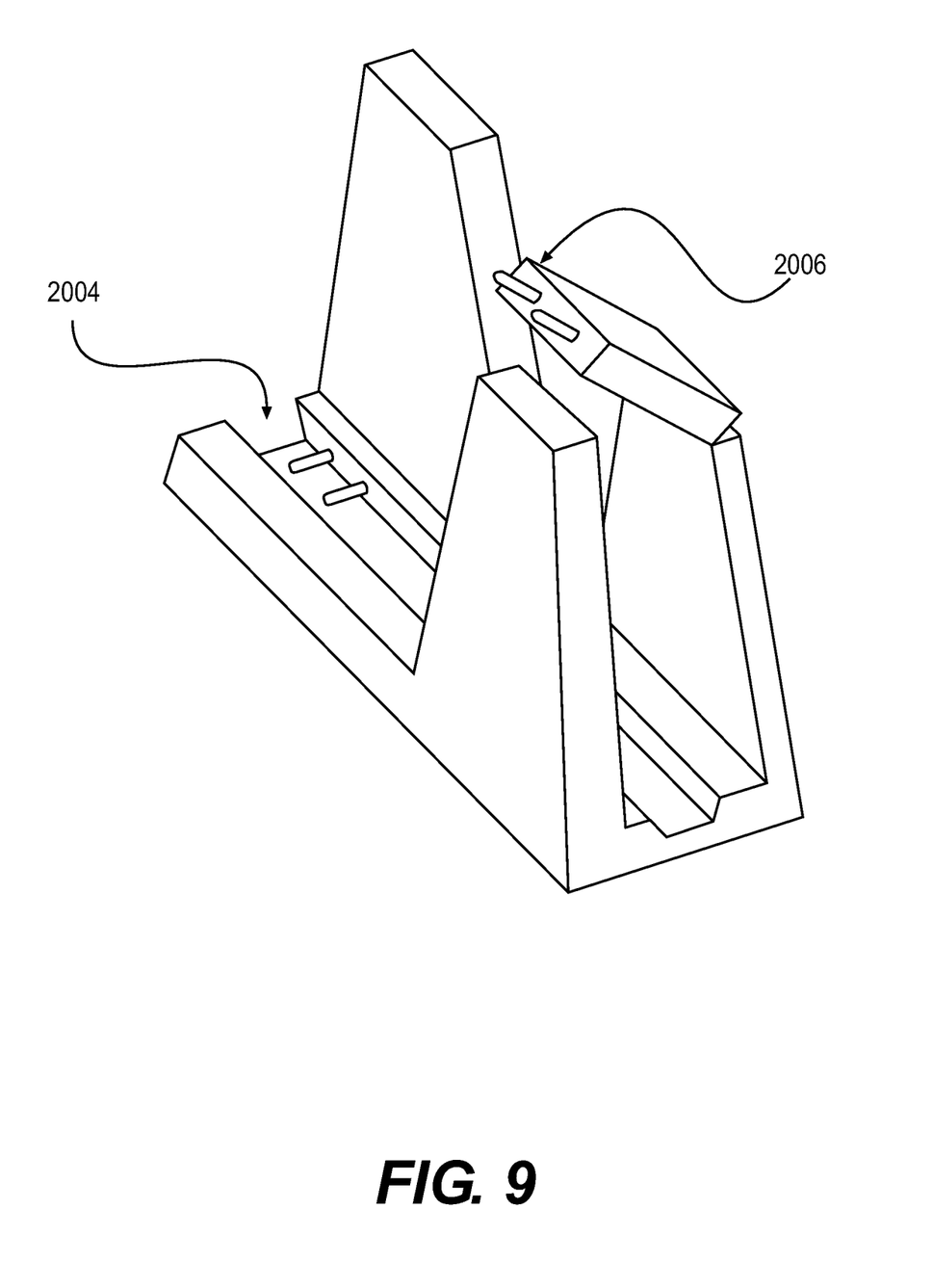
FIG. 9 is a view of the second embodiment of the present invention similar to that seen in FIG. 7 but illustrating a state in which the stand can receive a bicycle (or similar wheeled vehicle therein)

Second locking position 2006 is elevated relative to the wheel groove 2002 (and the first locking position 2004), for example by way of opposing vertical walls 2006a and 2006b on opposing sides of wheel groove 2002. The stand 2000 includes a pivotably mounted (for example, hinged) locking flap or member 2006c that pivots from a locking position in which it is generally horizontal and spans the distance between walls 2006a, 2006b, and a release position in which it pivots upwardly and out of the space between walls 2006a, 2006b. See, for example, FIG. 9 compared to FIG. 7. In the locking position, the locking flap 2006c is locked into engagement with the opposing wall (2006a in the figures, by way of example) by providing one or more of the latch mechanisms, also of the type described above relative to FIG. 4. In FIG. 9, two such latch mechanisms are shown by way of example.

The latch mechanisms used at the first and second locking positions are in accordance with the description of the latch mechanism illustrated in FIG. 4, and may be centrally actuated by a manually graspable handle 2010, for example located on a side of the stand 2000. See, for example FIG. 8, which is a reverse perspective view of stand 2000 compared to the view of FIG. 7. Flexible connectors 502 are at least schematically indicated in FIG. 8. The handle 2010 is associated with an actuation mechanism in accordance with the description of actuation mechanism 300' disclosed with respect to FIGS. 2 and 3a-3c above. In particular, reference is made to the pull member 316 illustrated in FIG. 3c and engaging multiple flexible connectors 502. By the use of such a pull member, the plurality of latch mechanisms contemplated by this second embodiment can be conveniently operated in unison from a single central location.

As mentioned above relative to FIGS. 1 and 2, the rotatable handle 2010 can be locked into place (to thereby lock the bicycle into place) for example by passing a lock (such as a padlock) through corresponding adjacent eyelets provided on the handle and the stand frame respectively when the handle is in a locking position.

Figure 10:
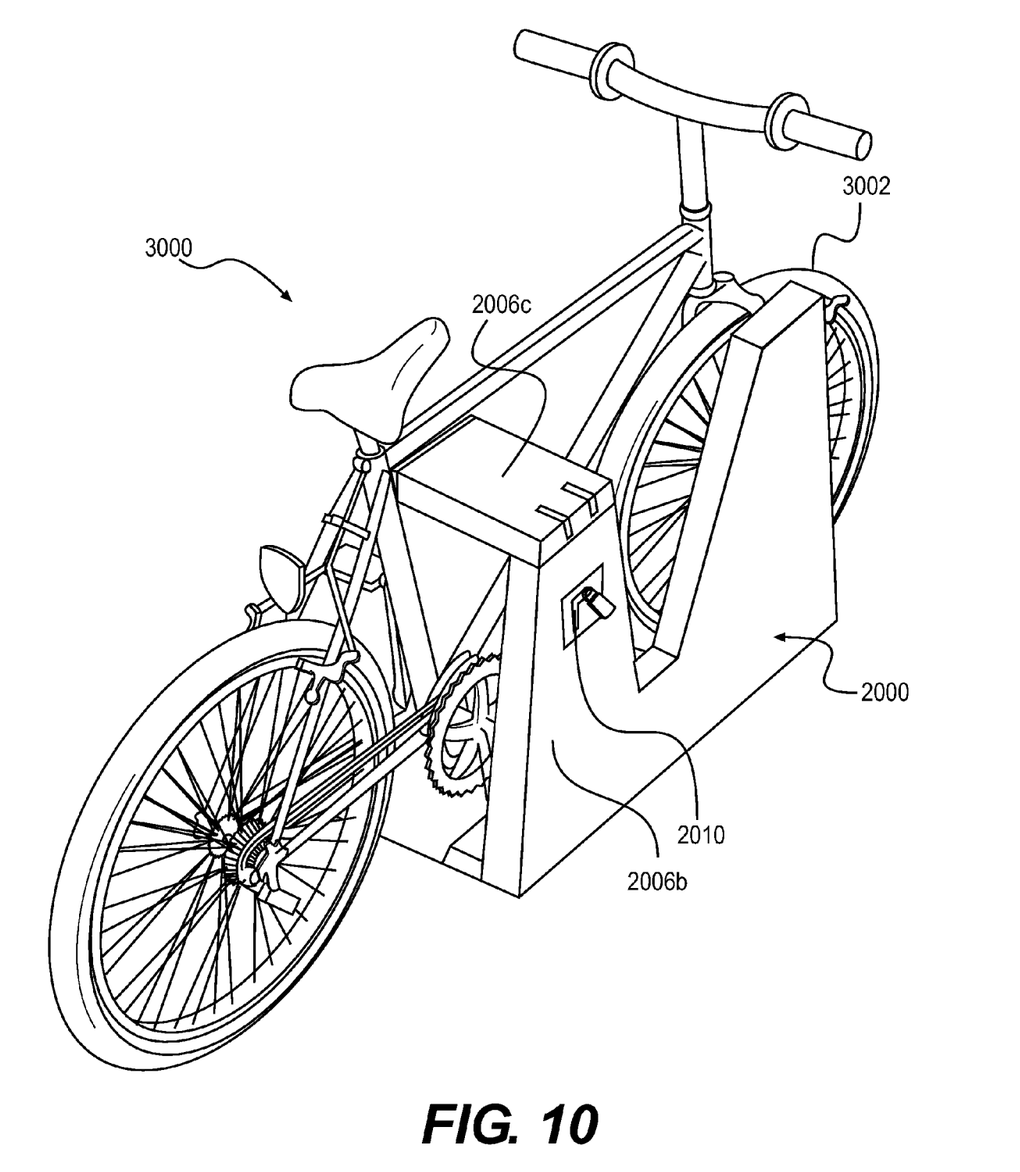
FIG. 10 is a view of the second embodiment of the present invention similar to that seen in FIG. 8, illustrating by way of example a bicycle received in the stand.

FIG. 10 illustrates an example of a bicycle 3000 parked and locked in the stand 2000. Although not visible in FIG. 10, the front wheel 3002 of bicycle 3000 is locked at the first locking position 2004 in accordance with the foregoing description. In addition, the locking flap 2006c is locked into position by extending through the front triangle (see above) of the frame of bicycle 3000. This provides a similar extra level of protection for the bicycle as described relative to the first embodiment, beyond merely engaging one of the wheels.

Although the present invention is described above with reference to certain particular examples for the purpose of illustrating and explaining the invention, it must be understood that the invention is not limited solely with reference to the specific details of those examples. More particularly, the person skilled in the art will readily understand that modifications and developments that can be carried out in the preferred embodiments without thereby going beyond the ambit of the invention.

What is claimed is:

1. A stand for securely parking a wheeled vehicle, comprising:
   a frame within which at least a part of at least one wheel of the wheeled vehicle is received; and
   a locking mechanism provided in the frame for retaining the wheeled vehicle relative to the frame and comprising:
   at least one latch mechanism provided with a corresponding selectively extensible latch member for operably retaining the wheeled vehicle relative to the frame, and
   an actuation mechanism for selectively controlling the retraction of the latch member of each at least one latch mechanism, wherein the actuation mechanism is connected to a respective at least one latch mechanism by a respective cable operably connected to the latch member of the respective at least one latch mechanism, the actuation mechanism being operable to selectively provide a pulling force on the respective cable to thereby selectively move the corresponding latch member into retraction, wherein the at least one latch mechanism can be selectively locked in a state such that the wheeled vehicle is lockingly retained relative to the frame.

2. The stand according to claim 1, wherein the latch member of the at least one latching mechanism is resiliently biased towards extension.

3. The stand according to claim 1, wherein the actuation mechanism is manually operable.

4. The stand according to claim 3, wherein the stand includes a manually graspable handle for manually operating the actuation mechanism.

5. The stand according to claim 4, wherein the handle is constructed and arranged to be locked in a position in which the corresponding one or more latch members are extended.

6. The stand according to claim 1, wherein the stand further comprises an electronic control unit comprising a selectively actuable servo motor operably connected to the actuation mechanism, and a control unit for selectively sending an actuation signal to the selectively actuable servo motor.

7. The stand according to claim 1, wherein the locking mechanism comprises one latch mechanism and an elongate flexible member having one end fixedly connected to the frame of the stand and being provided at an opposite end thereof with a locking key member having an aperture formed therein, wherein the frame is provided with locking slot located proximal to the one latch mechanism and into which the locking key member can be selectively inserted, wherein the locking key member can be selectively retained in the locking slot by engaging the latch member of the one latch mechanism with the aperture of the locking key member, the elongate flexible member thereby at least partly defining a retaining loop.

8. The stand according to claim 7, wherein the elongate flexible member is one of a security cable and a metal link chain.

9. The stand according to claim 7, wherein the latch member must be retracted and then released in order to engage the latch member with the aperture of the locking key member.

10. The stand according to claim 1, wherein at least one latch mechanism is located on the frame so that the corresponding latch member selectively extends outwardly so as to engage a portion of a wheel of vehicle and retain the wheel relative to the frame.

11. The stand according to claim 10, wherein the locking mechanism comprises a pivotable locking flap mounted on the frame that can be selectively positioned to extend through a portion of the wheeled vehicle and locked into place so as to retain the vehicle relative to the frame by obstructing movement of the vehicle relative to the frame.

12. The stand according to claim 11, wherein the wheeled vehicle is a bicycle and the locking flap can be selectively positioned to extend through a portion of a framework of the bicycle and locked into place.

13. The stand according to claim 11, wherein the locking flap is provided with at least one latch mechanism having a respective latch member that selectively extends into engagement with a portion of the frame so as to prevent the locking flap from being pivoted out of that position.

14. The stand according to claim 1, wherein the locking mechanism comprises a pivotable locking flap mounted on the frame that can be selectively positioned to extend through a portion of the wheeled vehicle and locked into place so as to retain the vehicle relative to the frame by obstructing movement of the vehicle relative to the frame.

15. The stand according to claim 14, wherein the wheeled vehicle is a bicycle and the locking flap can be selectively positioned to extend through a portion of a framework of the bicycle and locked into place.

16. The stand according to claim 14, wherein the locking flap is provided with at least one latch mechanism having a respective latch member that selective extends into engagement with a portion of the frame so as to prevent the locking flap from being pivoted out of that position.

17. The stand according to claim 1, wherein the respective cable is flexible and slidably disposed within an outer flexible tubular sheath so as to collectively define a flexible connector.

* * * * *